TELEVISION CAMERA DEVICES AND RELATED SYSTEMS

Filed July 17, 1964

2 Sheets-Sheet 1

Sept. 12, 1967 J. F. NICHOLSON 3,341,734

TELEVISION CAMERA DEVICES AND RELATED SYSTEMS

Filed July 17, 1964 2 Sheets-Sheet 2

United States Patent Office 3,341,734
Patented Sept. 12, 1967

3,341,734
TELEVISION CAMERA DEVICES AND RELATED SYSTEMS

James F. Nicholson, Pine City, N.Y., assignor to Westinghouse Electric Corporation, East Pittsburgh, Pa., a corporation of Pennsylvania
Filed July 17, 1964, Ser. No. 383,316
10 Claims. (Cl. 315—12)

ABSTRACT OF THE DISCLOSURE

This invention relates to those television camera devices known in the art as image dissectors and illustratively includes a photocathode element for converting a radiation image into a corresponding electron image, an aperture plate having an aperture therein, an electron multiplier disposed to receive that portion of the electron image directed through the aperture, and a suitable electrostatic or magnetic lens for varying the size of the electron image to thereby effect a corresponding change in the apparent size of the aperture.

This invention relates to electron discharge devices, and more particularly to improvements in those television camera devices known as image dissectors.

One of the earliest electronic television camera devices was the so-called image dissector tube. In 1934, P. T. Farnsworth disclosed an image dissector having a photocathode element for converting a light image into an electron image which is repeatedly scanned across a collecting aperture. Aligned with the aperture is a pick-up device such as an electron multiplier to increase the strength of the signal received. The Farnsworth device never met with much success for several reasons. Primarily in this period the photocathode element and electron multipliers available were rather inefficient and as a result the tube was found suitable only for outdoor televising or reproduction of motion pictures where the brightness of the objects to be viewed was quite high.

In the following years, the television industry developed such tubes as the iconoscope, the image orthicon and the vidicon which successfully replaced the image dissector for most commercial uses. However, in recent years, an interest has arisen for a very high resolution and narrow band transmission television camera device. In newly developed searching and tracking systems such as disclosed in the copending application, S.N. 424,577 (Westinghouse Case No. 36,104, entitled "Optical Imaging and Ranging System" by Homer A. Humiston and Fitz-Hugh B. Marshall, a high intensity light source is used to scan a field of search, and a high resolution television camera device such as an image dissector is set to scan in synchronization with the high intensity light source to receive the light reflected from an object in the desired field. Further, high resolution television camera devices have obvious application in the readout of information from condensed storage media such as microfilm.

The best television camera devices, presently available, have a resolution in the order of only 1000 television lines per inch. In addition, when operated at high resolutions, these devices have an amplitude response of approximately only 10% as compared with that response when operated at a lower resolution. For example, the optimum response of many television camera devices occurs at about only 200 lines per inch.

It is accordingly an object of this invention to provide an improved television camera device.

It is another object of this invention to provide an improved television camera device having a substantially increased resolution.

It is a further object of this invention to provide an improved image dissector having a resolution in excess of 3000 lines per inch.

It is a still further object of this invention to provide an improved image dissector having a collecting aperture whose apparent size may be readily varied.

It is another object of this invention to provide an improved image dissector whose resolution and light sensitivity may be readily adapted to the image viewed.

Briefly, the present invention accomplishes the above-cited objects by providing an improved image dissector wherein the electron image emitted by the photocathode element is magnified or diverged before it is focused upon the collecting aperture. In this manner, the relative or apparent size of the collecting aperture may be varied with respect to the size of the electron image focused in the plane of the aperture. In one embodiment of this invention, magnetic focusing means are disposed about the image dissector so that the diverging lines of flux emanating from the magnetic focusing means will act to magnify the electron image as it falls upon the plane of the collecting aperture. In another embodiment of this invention, an electrostatic lens is formed between the photocathode element and the collecting aperture to diverge and magnify the electron image.

Further objects and advantages of the invention will become apparent as the following description proceeds and features of novelty which characterize the invention will be pointed out in particularity in the claims annexed to and forming a part of this specification. For a better understanding of the invention, reference may be had to the accompanying drawings, in which:

Figure 1:
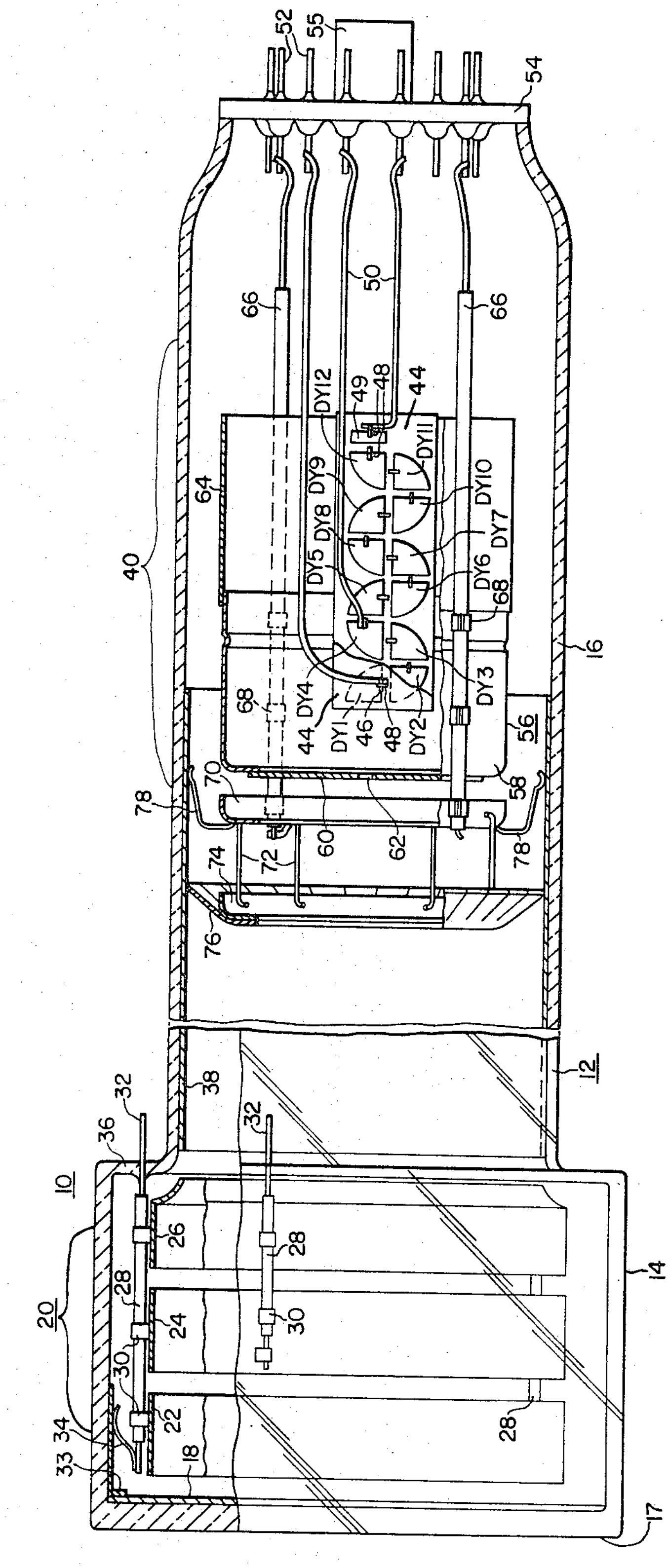
FIGURE 1 shows a partially sectioned view of an image dissector in which an embodiment of this invention may be incorporated.

Referring to the drawings and intially to FIG. 1, an image dissector 10 constructed in accordance with this invention comprises an evacuated envelope 12 having a cylindrical major portion 14 and a concentrically aligned, cylindrical minor portion 16. The major portion 14 of the envelope 12 is enclosed by a light transmissive face plate 17 upon which is deposited a photocathode element 18. In an exemplary embodiment of this invention, the photocathode element 18 was formed by first evaporating a layer of antimony upon the face plate 17 and then reacting this layer of antimony with alkali vapors.

An image section 20 is formed within the major portion 14 and comprises a G6 electrode 22, a target cup electrode 24 and a G5 electrode 26. These electrodes are formed of a cylindrical configuration and are aligned centrally of the envelope 12 in the order enumerated. The electrodes 22, 24 and 26 are mounted upon support rods 28 made of an insulating ceramic material such as alumina. The support rods 28 are connected to their respective electrodes by tabs 30 which may be welded to the surface of the electrode. The support rods 28 resemble the well known insulating "spaghetti" and connecting pins 32 may be inserted therethrough to provide electrical connections for the electrodes. The connecting pins 32 are further inserted through and are embedded in a shoulder portion 36 of the envelope 12, which is formed between the major portion 14 and the minor portion 16, to provide an external terminal. An electrical connection is provided for the photocathode element 18 by a terminal foil 33 which has been formed over a portion of the photocathode element 18 and the inner surface of the envelope 12; further, a resilient contact 34 is secured to one of the connecting pins 32 so as to resiliently abut against the terminal foil 33.

Within the minor portion 16 of the envelope 12 there is located a pickup or electron multiplier section 40 comprising a plurality of dynodes DY1 to DY12. The plurality of 12 dynodes DY1 and DY12 are positioned within a G3 electrode 56 which comprises a cup member 58 and an aperture plate or surface 60 secured to an end of the cup member 58 and having an aperture 62 therein centrally positioned of the envelope 12. The first dynode DY1 is aligned behind the aperture 62 to receive those electrons flowing through the aperture 62. The remaining dynodes DY2 to DY12 are positioned in a serpentine pattern to receive the flow of electrons from the preceding dynode and to generate secondary electrons toward the next dynode to provide a 12 fold multiplication of electrons flowing through the aperture 62. The dynodes DY1 to DY12 are mounted between two parallel disposed plates 44 which are made of an insulating material such as mica. Each of the dynodes is provided with two tabs 48 which are inserted into slots 46 of the insulating plates 44 and are twisted to thereby secure the dynodes to the insulating plates 44. There is positioned directly behind the last dynode DY12 a dynode anode 49 to receive the multiplied stream of electrons and to provide an output electrode for a signal corresponding to the image received on the photocathode element 18. Further, each of the dynodes DY1 to DY12 is attached to a connecting wire 50 (not all of the wires have been shown in FIG. 1) which are in turn connected to terminal pins 52. The terminal pins 52 are embedded in an end plate 54 of the envelope 12.

An umbrella shape shielding member 76 is inserted within the minor portion 16 of the envelope 12 to prevent electrons generated by the photocathode element 18 and other electrons from being attracted by the high voltages existing within the pickup section 40. The periphery of the shielding member 76 directly abuts against a G4 electrode 38 which comprises a non-reflective or black layer of a material such as titanium, aluminum or antimony which has been evaporated upon the interior of the minor portion 16 of the envelope 12. The G4 electrode 38 extends from the shoulder portion 36 to a point beyond the aperture plate 60, as shown in FIG. 1.

The umbrella shaped shielding member 76 is secured as by welding to an annular ring 74; further, support pins 72 are attached to the annular ring 74 and serve to space the shielding member 76 from an annular support ring 70. The support ring 70 is in turn mounted upon support rods 66 made of an insulating material such as alumina which are attached to the cup member 58. A cylindrical shielding element 64 is secured to the lower end of the cup member 58 and is positioned about the dynodes to also prevent electrons from being attracted by the high voltages applied to the dynodes. The support rods 66 may be mechanically secured by tabs 68 which are in turn welded to the metallic surfaces of their respective elements 70, 58 and 64.

The umbrella shaped shielding member 76 is spaced from the aperture plate 60 as shown in FIG. 1. It has been found that during the evacuation of the envelope 12, that it was necessary to provide a spacing between these elements in order to allow the gas within the major portion 14 to be pumped through the minor portion 16 and through an exhaust valve 55 in the end plate 54.

Electrical connections may be made through pins 52 to the G3 electrode 56 and the G4 electrode 38 by connecting wires 50 which have been inserted through the hollow portions of the "spaghetti" like support rods 66. More specifically, the electrical connection to the G4 electrode 38 is made by the connecting wire 50 through the electrically conductive support ring 70 to a resilient bulb spacer 78 which has been secured as by welding to the support ring 70. The other end of the bulb spacer 78 is resiliently held against the metallic layer forming the G4 electrode 38.

Figure 2:
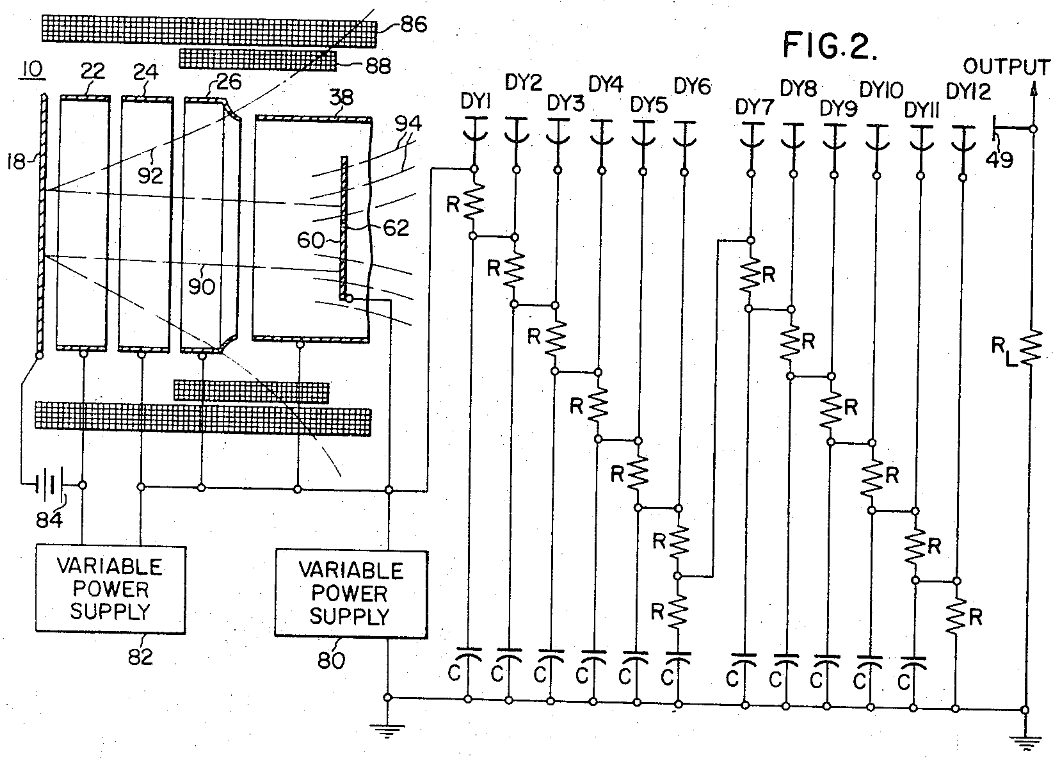
FIG. 2 shows a diagrammatic view of an image dissector in which a magnetic, image diverging means has been used.

Referring now to FIG. 2, a diagrammatic view of the image dissector 10 is shown incorporating a magnetic means for diverging the electron image. As shown in FIG. 1, the photocathode element 18 is presented with a plurality of elements—i.e. the G6 electrode 22, the target cup electrode 24, the G5 electrode 26 and the G4 electrode 38—aligned axially of each other and disposed about the pathway of the electron image emitted by the photocathode element 18. The aperture plate or surface 60 is disposed at the opposite end of the image dissector 10 from the photocathode element 18. A set of deflection coils 88 are disposed about the envelope 12 (not shown in FIG. 2) of the image dissector 10 to scan the electron image emitted by the photocathode element 18 across the collecting aperture 62. Further, a magnetic focusing coil 86 is disposed about the image dissector 10 to focus and to magnify or diverge the electron image emitted by the photocathode element 18.

As depicted in FIG. 1, the dynodes DY1 to DY12 are each disposed to receive the flow of electrons from the preceding dynode and to emit secondary electrons into the dynode immediately following. As diagrammatically shown in FIG. 2, the dynodes DY1 to DY12 are aligned behind the collecting aperture 62 to provide a 12 fold multiplication of the electrons penetrating the collecting aperture 62. The output signal of the image dissector 10 is taken from the anode dynode 49 which has been interconnected through a load impedance $R_L$ to ground. Each of the dynodes DY1 to DY12 is set at a specified voltage which is incrementally decreased by a constant value from the voltage applied to the preceding dynode. In an exemplary arrangement, a voltage dividing matrix is formed of resistances R and capacitors C; more specifically, each of the dynodes DY1 to DY11 is connected in series through the resistor R and the capacitance C to ground with the low potential end of each resistance R being electrically tied to the high potential end of the following resistance R. The last dynode DY12 is interconnected by a sole resistance R to ground. A variable power supply 80 is connected across the resistor R associated with the first dynode DY1 to ground. In this manner, the voltage supplied by the variable source 80 may be applied by the resistive matrix to the respective dynodes in incremental values decreasing from DY1 to DY12 by a constant value. In an actual embodiment, the value of the resistances R was selected to be 560K and the value of the capacitance C was selected to be 0.01 microfarad. In a typical operation, the variable power supply 80 was set at a —2200 volts to provide a voltage difference between each of the dynodes of approximately 180 volts.

In the magnetic version of this invention shown diagrammatically in FIG. 2, the electrodes 24, 26, 38 and 60 are electrically interconnected and are maintained by the variable source 80 at the same potential as the first dynode DY1. As a result, a substantially continuous electrostatic field is provided between the target cup electrode 24 and the first dynode DY1. In order to accelerate the electron image emitted by the photocathode element 18 and thereby focus the electron image upon the aperture plate 60, the G6 electrode 22 is maintained at a negative voltage with respect to the target cup electrode 24 by the variable power supply 82. As is well known in the art, an adjustment or focusing of the electron image may be accomplished by accelerating the electron image between electrodes maintained at increasingly positive voltages in a magnetic field. Further, the photocathode element 18 is maintained at a negative voltage with respect to the G6 electrode 22 by a fixed voltage source 84. In a typical mode of operation, the variable voltage source 82 could be adjusted between 400 and 450 volts to thereby maintain the electron image focused upon the face plate 60. Further, the fixed voltage source 84 is typically set at 500 volts.

In operation, the electromagnetic version of the image dissector 10 functions in the following manner. A light image is focused upon the photocathode element 18 which in turn emits a flow of electrons corresponding in configuration to the light image. The flow of electrons or electron image is accelerated by the successively positive voltages applied to the G6 electrode, and the target cup electrode, G4 and G3 electrodes. As explained above, the magnetic field created by the focusing coils 86 cause the accelerating electron image to be focused upon the aperture plate 60. The electron image is scanned both vertically and horizontally across the receiving aperture 62 of the aperture plate 60 by the set of deflection coils 88. It is noted that the electron image could likewise be scanned in a circular pattern across the aperture 62. That portion of the electron image falling upon the collecting aperture 62 will be directed onto the first dynode DY1; this portion of the electron image is then successively multiplied as the electrons are directed from dynode to dynode. The multiplied portion of the electron image is finally directed to the dynode anode 49 and an output voltage is established across the load resistance $R_L$. The output of the image dissector 10 may then be applied through conventional amplifying means to a cathode ray tube which has been synchronized with the rate of scanning of the deflection coils 88 to reproduce the visual light image focused upon the photocathode element 18.

One of the principal features of this invention lies in the manner in which the electron image is diverged or magnified as it is focused upon the aperture plate 60. In the ordinary image dissector, the magnetic focusing coils are adjusted that they produce lines of flux which are directed linearly from the photocathode element 18 to the face plate 60 in a line perpendicular to the face plate 60. As shown in FIG. 2, the outline 90 of the electron image of such an image dissector would remain undiverged or unmagnified as it is focused upon the aperture plate 60. However, in accordance with the concepts of this invention, the position of the magnetic focusing coils 86 is so adjusted that the lines of flux 94 generated by the coils 86 and the electron image as shown by outline 92 diverge at the point where they intercept the aperture plate 60.

One result of diverging or magnifying the electron image is a corresponding magnification of the visual image as seen upon a monitoring cathode ray tube. Another effect is a varying of the apparent size of the aperture 62. Though in one actual embodiment of this invention, an image dissector 10 was produced having a receiving aperture 62 with a physical dimension of 0.6 mil, the apparent size of the receiving aperture 62 may be effectively increased or decreased with regard to the dimension of the electron image focused in the plane of the aperture plate 60.

An analogy of the effect of changing the effective aperture size of the image dissector of this invention may be made with varying the iris of a photographic camera. As is well known in the photographic arts, one may increase the resolution of the image focused upon the film by decreasing the diameter of the iris; whereas, under conditions of less light the iris may be opened to achieve proper exposure of the film at a corresponding sacrifice in the resolution of the picture taken. Though it would be very difficult if not impractical to change the size of the receiving aperture 62 physically, the apparent size of the receiving aperture may be readily varied in accordance with the teachings of this invention. The apparent size of the receiving aperture 62 may be decreased by diverging the electron image (as shown by outline 92); more specifically, the size of the receiving aperture 62 is reduced in comparison with the dimension of the electron image as it is focused in the plane of the aperture plate 60. The receiving aperture 62 will in effect view a smaller overall portion of the electron image thereby improving the resolution of the recorded image. However, it is noted that when the electron image is diverged correspondingly, less electrons will penetrate the receiving aperture 62 and the output signal from the dynode anode 49 will be reduced. Conversely, the electron image may be converged with the result that the apparent size of the collecting aperture is increased. Thus, more electrons will penetrate the receiving aperture 62 and the output signal will be increased. High resolution may be achieved by diverging the electron image and yet maintain the strength of the signal output by reducing the rate at which the set of deflection coils 88 scan the electron image across the aperture 62. By reducing the rate of scan, more electrons are allowed to penetrate the collecting aperture 62 and as a result a stronger signal and also a higher signal to noise ratio may be achieved.

Figure 3:
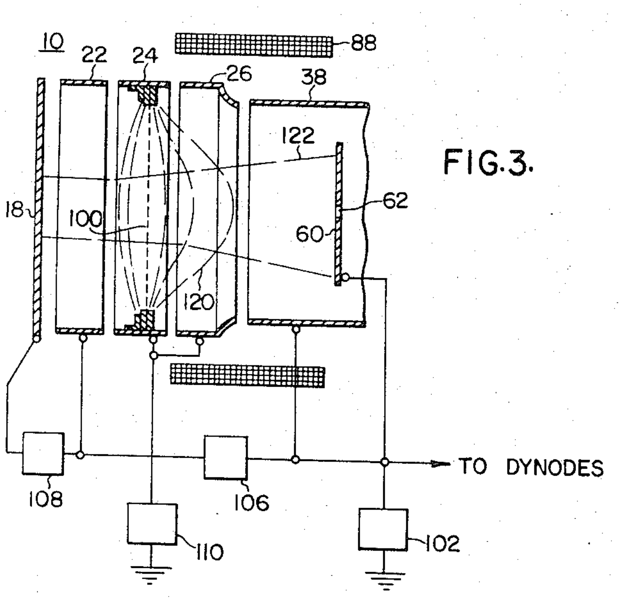
FIG. 3 shows a diagrammatic view of an image dissector into which an electrostatic means to magnify the electron image has been incorporated.

Referring now to FIG. 3, there is shown a diagrammatic view of an electrostatic embodiment of this invention. The image dissector 10 shown in FIG. 3 comprises a photocathode element 18 and a plurality of electrodes—i.e. a G6 electrode 22, a target cup electrode 24, a G5 electrode 26 and a G4 electrode 38—aligned in the order numerated and disposed about the electron image emitted by the photocathode element 18. The electron image emitted by the photocathode element 18 is scanned across an aperture 62 of the aperture plate 60 by a set of coils 88. A power supply 102 is connected from ground to the G4 electrode 38, the aperture plate 60 and the first dynode DY1 (the dynodes are not shown in FIG. 3). Specified voltage differences are applied between photocathode element 18 and the G6 electrode 22, and between the G6 electrode 22 and the G4 electrode 38 by power supplies 108 and 106 respectively. It is especially noted that the means for magnifying or diverging the electron image is provided by a mesh electrode 100 which is electrically connected to and supported by the target cup electrode 24. The electrode 100 is desirably made from a nickel or copper mesh of 500 lines per inch or finer. The voltage applied to the mesh electrode 100 is determined by a power supply 110 which is interconnected between the target cup electrode 24 and ground. Further, in this specific embodiment the G5 electrode 26 is electrically connected to and is maintained at the same potential as the target cup electrode 24.

Figure 4:
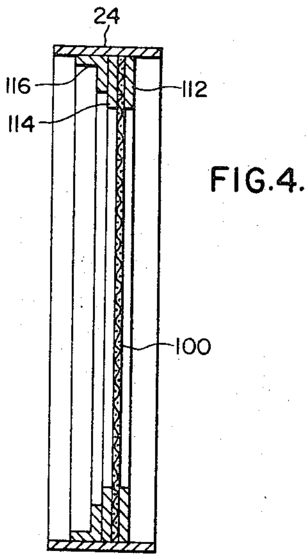
FIG. 4 shows a detailed view of the mesh electrode depicted diagrammatically in FIG. 3.

Referring now to FIG. 4, a particular embodiment of the structure to mount the mesh electrode 100 within the target cup electrode 24 is shown. In particular, the periphery of the mesh electrode 100 is secured between two annular support plates 112 and 114 by methods well known in the art such as spot welding. In turn, the annular support plates 112 and 114 are secured to an L-shaped bracket 116 having one leg thereof secured to the inner periphery of the target cup electrode 24 and the other secured to the support plate 114.

In the operation of the electrostatic version of this embodiment, the electron image generated by the photocathode element 18 is accelerated toward the aperture plate 60 by the successively positive voltages applied by the power supplies 106 and 108. The electron image is scanned in a television raster by the set of coils 88 across the aperture 62; a portion of the electrons of the electron image penetrate the aperture 62 and will be multiplied as explained above by the plurality of dynodes. The means for magnifying or diverging the electron image is provided by an electron mesh 100. A voltage positive with respect to that applied to either of the electrodes 22 or 38 is applied to the mesh electrode 100 by the power supply 110. The successive acceleration of the electron image as it approaches the mesh electrode 100 and the deceleration of the electron image as it proceeds away from the mesh electrode 100 causes the electron image as shown by the outline 122 to diverge as it falls upon the aperture plate 60. The mesh electrode 100, and the electrodes 22 and 38 create an electrostatic lens whose field is shown by the lines 120. In a typical mode of operation, the photocathode element 18 may be operated at a minus 500 volts whereas the G6 electrode 22 and the G4 electrode 38 may be operated respectively at a minus 450 volts and a minus 300 volts. Further, the mesh electrode 100 may be maintained at approximately a plus 1,000 volts to provide a voltage difference of approximately 1,500 volts between the mesh electrode 100 and the photocathode element 18. It is noted, that with a system as described above that a magnification or a divergence of approximately 10 was possible. Therefore though the actual physical size of the aperture 62 is .001 inch in diameter, that by diverging electron image through the mesh electrode 100 an apparent size of 0.0001 inch may be realized.

The degree of divergence of the electron image may be effectively controlled by varying the voltage applied to the mesh electrode 100. By increasing the voltage applied to the electrode 100, the velocity and the degree of divergence will correspondingly be increased. Conversely if the voltage applied to the electrode 100 is decreased, the degree of divergence will likewise be decreased.

Further, with regard to the electrostatic version of this invention shown in FIG. 3, a positive source of voltage (not shown) may be applied upon the last dynode DY12 to insure the proper voltage difference between each of the dynodes. It has been found desirable to establish a voltage difference of from 100 to 200 volts between the dynodes.

It is therefore apparent that there has been disclosed an improved image dissector capable of meeting the high resolution and narrow bandwidth transmission requirements required in such diverse applications as searching and tracking systems, microfilm readout, and the broadcasting of motion pictures in commercial television. More specifically, this invention discloses an image dissector which is capable of a resolution of 1,500 lines at 100% response and a resolution in excess of 3,000 lines per inch at 10% response.

While there has been shown and described what are presently considered to be the preferred embodiments of this invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim as my invention:

1. A camera device comprising first means for converting a radiation image into a flow of electrons corresponding to said radiation image, a member disposed to intercept said flow of electrons and having an aperture therein, second means for multiplying disposed to receive those electrons directed through said aperture, third means for scanning said flow of electrons across said aperture, and fourth means for varying the size of at least a portion of said flow of electrons to thereby effect a change of the apparent size of said aperture.

2. A television camera device comprising an evacuated envelope having therein a photocathode element for transforming a light image into a flow of electrons corresponding to said light image, an electron multiplying means disposed to receive said flow of electrons, a surface being disposed between said photocathode element and said electron multiplying means and having an aperture through which a portion of said flow electrons is directed to said electron multiplying means, and means for diverging said flow of electrons to effect a change of the apparent size of said aperture including an electrostatic lens disposed between said cathode element and said surface.

3. A camera device comprising first means for converting a radiation image into an electron image corresponding to said radiation image, a surface having an aperture therein, second means remote from said first means aligned with said aperture for receiving that portion of said electron image directed through said aperture, and third means for varying the size of said electron image to effect an apparent change of the size of said aperture.

4. A television camera device comprising first means for converting a light image into a flow of electrons corresponding to said light image, a member having an aperture therein, second means remote from said first means aligned with said aperture to multiply that portion of said flow of electrons directed through said aperture, and coil means disposed about said flow of electrons so that flux lines emanating from said coil means are diverging as said flux lines intersect said surface to effect a diverging of said flow of electrons.

5. A television camera device comprising a photocathode element for converting a light image into an electron image, an aperture plate upon which said electron image is focused, said aperture plate having an aperture therein, an electron multiplier remote from said photocathode element and aligned with said aperture to receive that portion of said electron image directed through said aperture, first coil means for scanning said electron image across said aperture, and second coil means for focusing said electron image on said aperture plate, said second coil means being disposed so that the flux lines emanating from said second coil means are diverging as they intersect said aperture plate to effect a magnification of said electron image.

6. An image dissector comprising an evacuated envelope, a photocathode element for transforming a light image into an electron image, an electron multiplier disposed remotely from said photocathode element, an aperture plate disposed between said electron multiplier and said photocathode element and having an aperture therein which is aligned with said electron multiplier, at least two tubular electrodes disposed about the path of said electron image and between said photocathode element and said aperture plate, said electrodes being set at different potentials to accelerate said electron image toward said aperture plate, a set of coils disposed about said evacuated envelope for scanning said electron image in a raster across said aperture, and a magnifying coil disposed about said evacuated envelope so that the flux lines emanating therefrom are diverging when they intersect said aperture plate, said magnifying coil causing said electron image to be diverged and therefore to vary the apparent size of said aperture.

7. A camera device comprising first means for converting a radiation image into a flow of electrons corresponding to said radiation image, second means for multiplying said flow of electrons being disposed to receive said flow of electrons, a member interposed between said first and second means and having an aperture through which a portion of said flow of electrons is directed, and third means for diverging and converging said flow of electrons and including a mesh electrode inserted between said first means and said surface.

8. An image dissector comprising first means for converting a light image into an electron image, a surface having an aperture therein, second means remote from said first means and aligned with said aperture for multiplying that portion of said electron image directed through said aperture, third means including a coil for scanning said electron image across said aperture, and fourth means for diverging said electron image to change the apparent size of said aperture and including a mesh electrode inserted between said first means and said surface.

9. An image dissector comprising an evacuated envelope having a light transmissive surface on which is formed a photocathode element. said photocathode element transforming a light image into a flow of electrons corresponding to said light image, a multiple stage electron multiplier disposed within a portion of said envelope remote from said photocathode element, an aperture plate disposed between said photocathode element and said electron multiplier and having an aperture therein which is aligned with said electron multiplier, a set of coils disposed about said envelope for scanning said flow of electrons in a defined raster across said aperture, and an electrostatic means inserted between said photocathode element and said aperture plate for diverging said flow electrons to effect a change of the apparent size of said aperture, said electrostatic means including first and second tubular electrodes and a mesh electrode inserted therebetween.

10. An image dissector comprising an evacuated envelope having a first and second portion, said first portion having a greater diameter than said second portion, a photocathode element disposed within said first portion for transforming a light image into an electron image, a surface having an aperture therein and disposed within said second portion, an electron multiplier positioned remotely from said photocathode element and aligned with said aperture, and means for diverging said electron image to effect a change of the apparent size of said aperture.

References Cited

UNITED STATES PATENTS

| | | | |
|---|---|---|---|
| 2,541,374 | 2/1951 | Morton | 178—7.2 |
| 2,723,360 | 11/1955 | Rotow | 315—11 |

JOHN W. CALDWELL, *Acting Primary Examiner.*

T. A. GALLAGHER, R. K. ECKERT, JR., *Assistant Examiners.*